Patented Oct. 26, 1937

2,097,212

UNITED STATES PATENT OFFICE 2,097,212

TABBING COMPOSITION

Leon J. D. Healy, Milwaukee, Wis., assignor to Lee Hardware Company, Salina, Kans.

No Drawing. Application October 19, 1934,
Serial No. 749,128

5 Claims. (Cl. 134—17)

The present invention relates to a tabbing and book-binding composition, containing rubber latex in its original i. e. unvulcanized, uncoagulated condition, although it will be understood that the latex may be concentrated to a greater or less extent by centrifugal separation or other appropriate method.

In a Patent Number 1,966,389, issued July 10, 1934 to my assignees, I have described a composition for the purposes indicated, in which uncoagulated vulcanized rubber latex is used as a source of rubber. In accordance with the present invention, I aim to make a product which has properties similar to those of the above mentioned material, and in some respects even slightly better, which will avoid the necessity of the vulcanization of the rubber latex to be used in the said composition, which is a rather expensive process.

In accordance with the present invention, I use rubber latex in its unvulcanized condition, and uncoagulated. A small quantity of ammonia being added to the latex, as usual, as a preservative. Other preservatives can of course be employed, in place of the ammonia. The latex may conveniently be concentrated by centrifugal treatment, to about 60% total solids.

The second component of the mixture is a stabilizing solution, preferably containing a proteid material. For this purpose a casein solution, in an alkaline material such as water containing a little ammonia can be used.

The third component of the final mixture is a vulcanizing and reinforcing material, to which an age resistor can be added if desired. There may conveniently be used in this third component, a wetting compound such as a sulphonated higher alcohol, or in some cases a sulphonated fatty oil, such as turkey red oil, sulphonated oleic acid or the like. This component may also contain zinc oxide, vulcanization accelerators, sulphur and cellulose flocks such as alpha pulp or cotton in the form of flocks.

The following specific example of making the composition is given, but it will be understood that this is given purely for the purpose of illustration, and not as restricting the scope of the invention thereto, the scope of the invention being defined in the appended claims.

Component 1.—This consists of 850 parts of concentrated natural rubber latex, containing approximately 60% of total solids (510 parts of solids). If a latex less concentrated or more concentrated is to be employed, it is preferable to use such a quantity as will give or contain 510 parts of the dry latex solids. The latex contains the usual amount of ammonia or other preservative.

Component 2.—This may consist of a viscous liquid containing 60 parts of casein dissolved in 300 parts of water containing 5 parts of concentrated ammonia solution (28% aqua ammonia). The solution is preferably effected by mixing the materials and heating up the mixture, say to 120 to 160° F., while stirring until the casein has gone into solution. The casein can be first soaked in water to soften the same, particularly if not in a finely powdered condition.

Component 3.—A water solution is prepared by adding 1 part of sulphonated higher alcohols, (alcohols containing 4 carbon atoms or more), in 150 parts of water. To this solution is then added say 2.5 parts of zinc oxide, of the kind ordinarily used in rubber as activator, 5 parts of dibetanaphthyl-para-phenyl-diamine, 4 parts of zinc-pentamethylene dithiocarbamate, 2.5 parts of sulphur, and say 25 parts of alpha cellulose flocks. This entire mixture is then ground, say in a ball mill or other suitable mill, to a thin milky liquid. Coloring matter and deodorant or perfuming agent can be added if desired, at this stage.

Having prepared the three components separately, these are now combined, for example by adding the component No. 2, casein solution, to the latex, with constant stirring or agitation. This can be done before or after cooling the casein solution, and if the mixture of the two is considerably above room temperature, it is cooled to or below room temperature before proceeding, in order to get most satisfactory results.

Component No. 3 is then slowly added and stirred into the mixture of No. 1 and No. 2, to give a uniform mixture which will have a soft pasty consistency, so that it can readily be spread by means of a brush, or can be sprayed upon the edge of the stack of paper sheets. It can also be applied by mechanical spreaders or machine rolls if desired.

The mixture produced by the above example will have substantially greater tack than the final mixture produced under Patent 1,966,389 above mentioned.

Instead of using natural latex, a dispersion of synthetic rubbers such as polychloroprene or polybromoprene can be employed, in component No. 1.

Component No. 2 may consist of other adhesive liquids, such as solutions of various gums, like agar-agar, gum arabic, ammonium alginate, alkaline dextrine solution, starch paste, egg albumin, blood albumin or the like. These materials, in the dissolved condition can be referred to generally as an aqueous fluent adhesive stabilizer for latex, and the said term is so used hereinafter.

The example of the third component, as given above, is very satisfactory. It will be understood that other wetting and dispersing agents can be employed, particularly sulphonated organic bodies including sulphonated fatty oils, sulphonated fatty acids, turkey red oil and the like.

The quantities of the materials added can vary, for example the dibetanaphthyl-para-phenyldiamine can vary between about 1 and 10 parts, the zinc oxide can vary between 2 and 10 parts, the zinc-pentomethylene-dithiocarbamate and sulphur can each vary from about 1 to 10 parts. The cellulose flocks can vary from 10 or 20 parts up to 75 parts, more or less. The accelerators and antioxidants can be interchanged with other well known materials used for the purpose, in the rubber vulcanization art. It is of course understood that the proportions of these reacting materials will largely determine the speed of vulcanization of the final mixture, during the latter stages of the drying out, and after the drying out is apparently completed. Prior to the stage here indicated, substantially no vulcanization of the rubber in the latex, will occur.

In a modified form of component No. 3, I may employ 2 parts of sulphonated alcohols or sulphonated fatty oils or sulphonated fatty acids, dissolved in 150 parts of water, together with 7.5 parts of zinc oxide, 2.5 parts of sulphur, 5 parts of mercaptobenzothiazole, 2.5 parts of zinc-dimethyldithiocarbamate, 4 parts of dibetanaphthyl-para-phenyldiamine and 25 parts of cellulose flocks. This mixture is ground, for instance in a ball mill, as given above.

A further modification of component No. 3 can be made by adding 2 parts of sulphonated alcohols to 150 parts of water, and adding 12.5 parts of zinc oxide, 12.5 parts of tetramethylthiuramdisulphide, 2.5 parts of sulphur, 25 parts of alpha cellulose flocks. This mixture is made uniform as indicated above.

It is sometimes advisable to add metallic soaps in connection with component number 2, for example aluminum stearate, calcium palmitate and the like.

The tabbing compound, described as above, may be applied to the edge of a stack of paper to be made into a tablet or pad, by means of a brush, spray, spreader or machine roll. Usually one coat is sufficient, but in some cases, particularly in book-binding, it may be advisable to apply a first coat, to allow this to dry and then apply a second coat. Where one coat is applied, the coating will be substantially free from tackiness, and will appear substantially dry after 20 or 30 minutes, under ordinary atmospheric conditions. Drying at an elevated temperature accelerates the drying and setting of the composition, and also accelerates the vulcanization of the rubber constituent.

After drying, the dried surface may be dusted with talc or similar material if desired, but it is ordinarily not necessary.

If the compound, in the can or jar, before use has dried out more or less, say by evaporation, it can be diluted with water or water containing a little ammonia if desired. For application of the material by means of a spray, it may be advisable to first dilute the material by the addition of water, or water with a little ammonia, to produce a composition of a freely-liquid creamy consistency. The compositions heretofore proposed for tabbing, of this general type, could not readily be applied by means of a spray.

The vulcanization of the material is of course progressive, depending upon the temperature. By stacking the pads, over night, on a steam radiator will of course considerably accelerate the vulcanization. In some instances it is advisable to place the pads or books when made up, in a suitable oven and heat the same to around 180 to 220° F., say 220° F. for 20 to 30 minutes, during which time the vulcanization would be substantially complete. Or the reaction can be started by heating the material to such a temperature as 180° F. for 10 or 15 minutes, after which the vulcanization would complete itself within a few days at ordinary room temperature. The acceleration of the vulcanization by heating the coated material, after drying, is very advisable. A setting up action takes place by heating for an hour, to 130° F., or by heating for a short time to 160 or 180° F., and the vulcanization will then complete itself within a day or more, at ordinary room temperature.

"Rubber latex" as the term is used herein, is used to cover the milky exudate from the trees of the species *Hevea braziliensis*, and is not intended to cover latex of the types of pontianak, chicle, milk weed, etc., which products would be unsuitable for the process.

The addition of cellulose flock is to give a reinforcing action. There may also be added other reinforcing agents, such as clays, asbestos, or equivalent materials.

It is understood that the coloring and perfuming agents referred to above are optional. Any suitable dye or pigment can be used, and scenting agents capable of giving an agreeable odor or merely for covering up the odor of ammonia etc. can be added or omitted, as desired.

In some instances, I find it advantageous to incorporate a solution of synthetic rubber, of the type mentioned above, or polymerization products of isoprene, butadiene, etc., with the rubber latex. Such a solution can be made by dissolving each pound of the synthetic rubber in about half a gallon of carbon tetrachloride. Other solvents can be used such as benzol, toluol or other hydrocarbons such as trichlorethylene. The relative amounts of the said solution and of latex can vary, equal parts could be used or 2 to 4 of the latex to one of the said solution. The said solution of synthetic rubber in the organic solvent can also be emulsified in a casein solution (or other adhesive as above) the cellulose flock or other reinforcing agent added, and sulphur, zinc oxide etc. added or not as desired.

In further modifications of the present invention, I may substitute in place of all or part of component 1, (unvulcanized rubber latex) a quantity of an aqueous suspension or dispersion of powdered raw rubber, powdered reclaimed or reworked rubber, or synthetic rubber (of either of the types given, polymerized vinyl acetylene or, less advantageously, polymerized isoprene or polymerized butadiene). Also solutions of synthetic rubber, particularly of the polychloroprene and polybromoprene type in organic solvents, can be used as a substitute for the unvulcanized rubber latex. The latex itself is preferred to these substitutes, as it produces products having superior properties.

The last mentioned type of synthetic rubbers, do not vulcanize in the sense that natural rubber does, but on long standing, or by heating for a short time (say 10–30 minutes) to temperatures around 200–220° C., they undergo a polymerization which might be regarded as somewhat analogous in its effect, to vulcanization of natural rubber. As is known, the polymerization can be accelerated by the incorporation of zinc oxide, sulphur, rosin, rosin oil and similarly acting substances.

With compositions containing the polychloroprene or polybromoprene, the amount of zinc oxide, for serving effectively as a polymerization catalyst, can vary between about 0.5% and about 10%.

While the use of dispersions of reclaimed rubber, dried rubber and synthetic rubber, and mixtures of solutions of these with emulsifying agents, is embraced within the broader aspect of the invention, the use of the unvulcanized rubber latex (natural or concentrated) with stabilizers, constitutes the preferred modification, as giving superior results.

I have referred to cellulose flocks in the formulas. In some instances, as where high extensibility and elasticity are desired, these can be omitted.

Compositions as described, should be stable (i. e. can be kept, without losing their usefulness) for a period of at least several months and preferably should be stable for several years, if kept in closed receptacles.

Synthetic rubber swelled in organic solvents (the latter being, if desired, in only a minor fraction of the amount necessary to dissolve the said rubber, and in some cases less than the amount of said rubber) can also be emulsified with the above materials, instead of latex. The said emulsification can be effected by passing the mixture through a colloid mill.

In the manufacture of polychloroprene rubber, (this being a polymerized hydrogen chloride reaction product of vinyl acetylene) at one stage of the process, there exists a partially polymerized product which is very easily emulsifiable in water (or in water containing emulsifying agents). Such an aqueous emulsion can be used instead of latex, in the above formulas.

The following example is given:—

Component 1 can be a water dispersion of polychloroprene containing 500 parts on dry basis (exclusive of the water).

Component 2 will be about as mentioned before, namely, 60 parts of casein dissolved in 300 parts of water containing 5 parts of concentrated ammonia water (28%).

Component 3 can be a water solution prepared by dissolving 1 part of a sulphonated higher alcohol or other good wetting medium, in 150 parts of water. To this solution is then added (if desired) 25 parts of zinc oxide and 25 parts of cellulose flocks or cotton linters. The solution is placed in a ball mill or similar type of mill and ingredients well dispersed and wetted. Coloring matter and deodorant can be added at this stage.

Having prepared the three components, they can now be combined for example, by first mixing No. 1 and No. 2 with constant stirring. Then add component No. 3 and stir until a uniform consistency is obtained.

The synthetic rubbers are more expensive and produce inferior tabbing compounds. The natural latex compounds which form the preferred type, in this application, are accordingly preferred.

The butadiene and isoprene polymerization products can be dispersed in water with emulsifying agents like soap, colloidal clays, casein solutions etc. or dissolved in a solvent like benzole and emulsified directly with natural latex.

I also give the following example of a straight organic solution of synthetic rubbers of the polychloroprene type which contain no water. Such formulas would be about as follows:—

No. 1

| | |
|---|---|
| D (polychloroprene) (sold under the name "Duprene D") | lb____ 1 |
| Benzole | gal____ 1 |
| (or sufficient to make a viscous cement) | |

This solution can be applied directly as a tabbing compound. After evaporation of the solvent, the rubber sets up.

No. 2

| | |
|---|---|
| Duprene D | lb____ 1 |
| Cellulose flocks | oz____ 1 |
| Magnesium oxide | lbs____ 3 |
| Zinc oxide | do____ 10 |
| Benzole | gal____ 1 |

The duprene, flocks, magnesium, and zinc oxide are first masticated with the rubber on a mill and then dissolved in the benzole.

When spraying any of the straight water dispersions as noted in this application, it is possible to spray satisfactory with almost any degree of viscosity ranging from a very heavy paste of mayonnaise consistency to a thin watery solution. The best results are obtained with what we might call a thin mayonnaise consistency where the solution pours very slowly when container is inverted. One not familiar with spraying such a compound might think that was very heavy for spraying, but with proper nozzle equipment, it works beautifully. The presence of organic solvents gives more difficulty unless very perfectly emulsified. However the latter work very nicely with a brush. About the same consistency is also best for coating with a brush or by machine roller application.

I claim:—

1. A stable composition of matter suitable for use for tabbing paper and book-binding, to produce bindings which will remain flexible for a period of at least several months, which composition contains uncoagulated unvulcanized rubber latex, an aqueous fluent adhesive stabilizer for said latex, a vulcanizing agent for the rubber of the latex, a vulcanization accelerator, a sulphonated organic material which can act as a wetting agent, and cellulose flock, the amount of said vulcanization accelerator being insufficient to cause vulcanization of the rubber content of said latex until a large part at least of the water content has left the mixture, the said entire mixture being stable for a period of at least several months if evaporation of water is prevented, and drying to give a substantially plastic layer.

2. A stable composition of matter suitable for use for tabbing paper and book-binding to produce bindings which will remain flexible for a period of at least several months, which composition contains uncoagulated unvulcanized rubber latex, an aqueous solution of a proteaginous substance having adhesive properties and acting as a stabilizer for said latex, a vulcanizing agent for the rubber of the latex, a vulcanization accelerator, a sulphonated organic material which can act as a wetting agent, and cellulose flock, the amount of said vulcanization accelerator being insufficient to cause vulcanization of the rubber content of said latex until a large part at least of the water content has left the mixture, the said entire mixture being stable for a period of at least several months if evaporation of water is prevented, and drying to give a substantially plastic layer.

3. A tabbing composition as covered in claim 1, which also contains a solution of a synthetic rubber in an organic solvent.

4. A stable composition of matter suitable for use for tabbing paper and book-binding, to produce bindings which will remain flexible for a period of at least several months, which composition contains uncoagulated unvulcanized rubber latex, an aqueous fluent adhesive stabilizer for said latex, a vulcanizing agent for the rubber of the latex, a vulcanization accelerator, a sulphonated organic material which can act as a wetting agent, and a solid reinforcing element, the amount of said vulcanization accelerator being insufficient to cause vulcanization of the rubber content of said latex until a large part at least of the water content has left the mixture, the said entire mixture being stable for a period of at least several months if evaporation of water is prevented, and drying to give a substantially plastic layer.

5. A stable composition of matter suitable for use for tabbing paper and book-binding to produce bindings which will remain flexible for a period of at least several months, which composition contains an emulsion containing disseminated particles of unvulcanized rubber, an aqueous solution of a proteaginous substance having adhesive properties and acting as a stabilizer for said latex, a vulcanizing agent for the rubber of the latex, a vulcanization accelerator, and a sulphonated organic material which can act as a wetting agent, the amount of said vulcanization accelerator being insufficient to cause vulcanization of the rubber content of said latex until a large part at least of the water content has left the mixture, the said entire mixture being stable for a period of at least several months if evaporation of water is prevented, and said entire mixture drying to give a substantially plastic layer.

LEON J. D. HEALY.